US008521645B2

(12) United States Patent
Steele et al.

(10) Patent No.: US 8,521,645 B2
(45) Date of Patent: *Aug. 27, 2013

(54) METHOD AND SYSTEM FOR FACILITATING SWITCHING OF FINANCIAL INSTITUTION ACCOUNTS

(75) Inventors: Tolan Doak Steele, San Francisco, CA (US); Fran Schall, San Francisco, CA (US); Kim Randall, Foster City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 12/963,282

(22) Filed: Dec. 8, 2010

(65) Prior Publication Data

US 2011/0078075 A1 Mar. 31, 2011

Related U.S. Application Data

(63) Continuation of application No. 12/775,317, filed on May 6, 2010, now Pat. No. 7,870,069, which is a continuation of application No. 10/836,587, filed on Apr. 29, 2004, now Pat. No. 7,742,986.

(60) Provisional application No. 60/466,829, filed on Apr. 29, 2003.

(51) Int. Cl.
*G06Q 40/00* (2012.01)

(52) U.S. Cl.
USPC .......................................................... 705/39

(58) Field of Classification Search
USPC ..................................................... 705/35–45
See application file for complete search history.

(56) References Cited

U.S. PATENT DOCUMENTS

| | | | | |
|---|---|---|---|---|
| 5,913,202 A | * | 6/1999 | Motoyama | 705/36 R |
| 7,120,608 B1 | * | 10/2006 | Gallagher et al. | 705/68 |
| 7,587,363 B2 | | 9/2009 | Cataline et al. | |
| 7,606,752 B2 | * | 10/2009 | Hazlehurst et al. | 705/35 |
| 7,742,986 B2 | * | 6/2010 | Steele et al. | 705/39 |
| 7,848,974 B1 | * | 12/2010 | Sheehan | 705/35 |
| 7,857,363 B2 | * | 12/2010 | Navarsky | 292/315 |
| 7,869,504 B2 | * | 1/2011 | Wang et al. | 375/240.03 |
| 7,870,069 B2 | * | 1/2011 | Steele et al. | 705/39 |

(Continued)

OTHER PUBLICATIONS

"US Airways and American Express Renew Membership Rewards Program Agreement", PR Newswire. New York: Mar. 2, 1998. p. 1.*

(Continued)

*Primary Examiner* — Mohammad Z Shaikh
(74) *Attorney, Agent, or Firm* — Kilpatrick Townsend & Stockton LLP

(57) ABSTRACT

Techniques for switching a financial institution account for a debit account holder are provided. A request to convert a financial institution account is received from a customer. Information is obtained from the customer and used to identify a list of possible financial institution candidates. The list of possible financial institution candidates includes financial institutions that have an on-going relationship with an existing payment association and are interested in offering a new financial institution account to the customer. A new financial institution account is then established with a financial institution selected from a list of possible financial institution candidates. Then, the new financial institution account is linked to one or more additional accounts. The one or more additional accounts may be an account with the customer's existing payment association or accounts associated with any recurring transactions.

26 Claims, 3 Drawing Sheets

(56) References Cited

U.S. PATENT DOCUMENTS

| | | | | |
|---|---|---|---|---|
| 7,886,963 | B1* | 2/2011 | Barth | 235/379 |
| 7,917,435 | B2* | 3/2011 | Hall et al. | 705/40 |
| 8,055,564 | B2* | 11/2011 | Wehunt et al. | 705/35 |
| 8,121,947 | B1* | 2/2012 | Barth et al. | 705/40 |
| 8,392,305 | B2* | 3/2013 | Wehunt et al. | 705/35 |
| 2002/0062249 | A1* | 5/2002 | Iannacci | 705/14 |
| 2003/0004891 | A1* | 1/2003 | Van Rensburg et al. | 705/64 |
| 2003/0061093 | A1* | 3/2003 | Todd | 705/14 |
| 2003/0083933 | A1* | 5/2003 | McAlear | 705/14 |
| 2003/0101131 | A1* | 5/2003 | Warren et al. | 705/38 |
| 2003/0130895 | A1 | 7/2003 | Antonucci et al. | |
| 2003/0171992 | A1* | 9/2003 | Blagg et al. | 705/14 |
| 2003/0225688 | A1* | 12/2003 | Dobbins | 705/39 |
| 2003/0236726 | A1* | 12/2003 | Almonte et al. | 705/35 |
| 2004/0122736 | A1* | 6/2004 | Strock et al. | 705/14 |
| 2005/0021456 | A1* | 1/2005 | Steele et al. | 705/39 |
| 2005/0049964 | A1* | 3/2005 | Winterer et al. | 705/39 |
| 2005/0108149 | A1* | 5/2005 | Bent et al. | 705/38 |

OTHER PUBLICATIONS

"Fewer Glitches for Switches. It is Easier Than Ever to Change Accounts," Stephen Ellis, the Daily Telegraph: London (UK): Nov. 17, 2001, p. 11.*

"Points of Interest," Lisa Y. Taylor; San Antonio Business Journal. Jan. 24, 2003. vol. 17; Issue 1 ; p. 30.*

Collis, Roger,"A tricky dance to transfer miles among partners Ask Roger Collis", International Herald Tribune. Paris: Mar. 21, 2003. p. 21.*

"Beenz.com and MasterCard Announce Program to Enable Consumers to Convert On-line Rewards to Dollars on a MasterCard card", Canada NewsWire. Ottawa: Apr. 27,2000. p. 1.*

Anonymous, "Points confusion; Airline merger complicates frequent flyer point collection", Daily Gleaner. Fredericton, N.B.: Jul. 22, 2000.*

Nadler, Paul, "Comment: Break Through the Bank-Switch Nuisance Barrier", American Banker [New York, N.Y.] Nov. 13, 2001, pp. 1-3.*

"Charter One Simplifies Process of Switching Banks", PR Newswire [New York], Jun. 3, 2002, pp. 1-2.*

Walne, Toby, Banks are on the move at least over switching Fear stops many shopping around for the best of the new deals: [C1 Edition], Mail on Sunday [London (UK), Jun. 18, 2000, pp. 1-2.*

Search/Examination Report dated Mar. 17, 2006 from International Application No. PCT/US2004/013540, 12 pages.

"Banks Make the Switch Easier", Coventry Evening Telegraph. Coventry (UK) Nov. 20, 2001, p. 2.

"A tricky dance to transfer miles among partners Ask Roger Collis", Roger, Collis, International Herald-Tribune, Paris: Mar. 21, 2003. p. 21.

"Beenz.com and MasterCard Announce Program to Enable Consumers to Convert On-Line Rewards to Dollars on a MasterCard", Canada Newswire. Ottawa. Apr. 27, 2000. p. 1.

"Points confusion; Airline merger complicates frequent flyer point collection", Anonymous, Daily Gleaner. Fredericton, N.B.: Jul. 22, 2000.

"US Airways and American Express Renew Membership Rewards Program Agreement"; *PR Newswire*; New York; Mar. 2, 1998; p. 1; 6 pages.

Ellis, Stephen; "Fewer Glitches for Switches, It is Easier Than Ever to Change Accounts says Stephen Ellis," *The Daily Telegraph*; Nov. 17, 2011, p. 11; 2 pages.

Huang, Michelle; "Frequent Flier,"; *The Globe and Mail*; Toronto, Ont.; Apr. 7, 1999; p. C.11; 1 page.

Oldenburg, Don; "Choice of Credit Card Hinges on Intended Use,"; *Washington Post, Washington DC*; Feb. 4, 2003; p. C.09; 3 pages.

Taylor, Lisa Y.; "Points of Interest,"; *San Antonio Business Journal*; Jan. 24, 2003; vol. 17; Issue 1; p. 30; 4 pages.

Final Office Action mailed on Feb. 18, 2009 for U.S. Appl. No. 10/836,587, 14 pages.

Non-Final Office Action mailed on Jan. 9, 2008, for U.S. Appl. No. 10/836,587, 24 pages.

Non-Final Office Action mailed on Aug. 4, 2008, for U.S. Appl. No. 10/836,587, 41 pages.

Non-Final Office Action mailed on Aug. 3, 2009 for U.S. Appl. No. 10/836,587, 14 pages.

Notice of Allowance mailed on Mar. 17, 2010 for U.S. Appl. No. 10/836,587, 22 pages.

Notice of Allowance mailed on Sep. 2, 2010 for U.S. Appl. No. 12/775,317, 10 pages.

* cited by examiner

METHOD AND SYSTEM FOR FACILITATING SWITCHING OF FINANCIAL INSTITUTION ACCOUNTS

CROSS-REFERENCE TO RELATED APPLICATIONS

This application is a continuation of U.S. patent application Ser. No. 12/775,317, filed on May 6, 2010 entitled METHOD AND SYSTEM FOR FACILITATING SWITCHING OF FINANCIAL INSTITUTION ACCOUNTS, which is a continuation of U.S. patent application Ser. No. 10/836,587, filed on Apr. 29, 2004, entitled METHOD AND SYSTEM FOR FACILITATING SWITCHING OF FINANCIAL INSTITUTION ACCOUNTS, which claims priority from U.S. Provisional Patent Application No. 60/466,829 filed Apr. 29, 2003, entitled METHOD AND SYSTEM FOR FACILITATING SWITCHING OF BANK ACCOUNTS, all of which are hereby incorporated by reference, as if set forth in full in this document, for all purposes.

BACKGROUND OF THE INVENTION

The present invention generally relates to handling of financial institution accounts and, more specifically, to methods and systems for facilitating switching of financial institution accounts and any corresponding account linkages.

Various payment methods are currently available to consummate payment for commercial transactions. Such payment methods include, for example, credit cards and debit cards. Transactions conducted with credit cards and debit cards generally involve a payment association, such as Visa.

Furthermore, with respect to transactions conducted with debit cards, direct deposit accounts (DDAs) maintained by financial institutions are also involved. In a typical debit-card payment arrangement, a debit card is offered by a financial institution, such as a commercial bank, in collaboration with a payment association. The debit card is generally tied to a DDA at the issuing financial institution that issues the debit card to the account holder. Unlike a typical credit-card payment arrangement, when the account holder uses his/her debit card to pay for a transaction, no credit is extended to the account holder. Instead, the amount needed to satisfy the transaction is deducted from the DDA of the account holder.

In the debit-card payment arrangement, the issuing agreement between the financial institution and the payment association may terminate. For example, a financial institution for business reasons may switch from one payment association to another. Typically, when that happens, the financial institution issues new debit cards to its customers under the brand of the new payment association. In some cases, however, some of the financial institution's customers may not wish to carry a card with the brand of the new payment association for any number of reasons. For example, a customer may wish to stay with the original payment association because s/he has earned substantial rewards or loyalty points with that payment association, and a switch to the new payment association would mean forfeiting those rewards. A customer may also have loyalty to one payment association over the other, based on unique promotions, sponsorships, and/or co-brand relationships offered by that association. In these cases, the customer would need to make a transition to a new financial institution that issues debit cards carrying the brand of the desired payment association. This would include not only opening a new DDA with a different financial institution and closing the old DDA, but migrating any linkages to the new DDA for purposes of, for example, direct deposit (e.g., payroll checks from an employer) or automatic bill payments (e.g., recurring payments for monthly bills). Because of these potential linkages, it can be a very tedious process for a financial institution customer to go through in order to make that transition to remain with the old payment association.

Hence, it would be desirable to provide methods and systems that are capable of streamlining the process of switching DDA accounts in order to maintain a debit-card relationship.

BRIEF SUMMARY OF THE INVENTION

The present invention generally relates to facilitating the switching of financial institution accounts and any corresponding account linkages. In one embodiment, a financial institution account for a debit account holder is switched. A request to convert a financial institution account is received from a customer. Information is obtained from the customer and used to identify a list of possible financial institution candidates. The list of possible financial institution candidates includes financial institutions that have an on-going relationship with an existing payment association and are interested in offering a new financial institution account to the customer. A new financial institution account is then established with a financial institution selected from a list of possible financial institution candidates. Then, the new financial institution account is linked to one or more additional accounts. The one or more additional accounts may be an account with the customer's existing payment association or accounts associated with any recurring transactions. Thus, a customer may be able to retain any accrued benefits or accrue further benefits via the existing payment association with the new financial institution account. Also, any recurring transactions are transferred to the new financial institution account.

In one embodiment, a system for facilitating switching of financial institution accounts for a debit account holder is provided. The system comprises: control logic configured to obtain information from the debit account holder; control logic configured to identify a list of possible financial institution candidates based on the obtained information; control logic configured to establish a new financial institution account with a financial institution selected from the list of possible financial institution candidates; and control logic configured to link the new financial institution account to one or more additional accounts.

In another embodiment, a method for facilitating switching of a current financial institution account for a debit account holder to a new financial institution account is provided. The method comprises: obtaining information from the debit account holder; determining a list of possible financial institution candidates based on the obtained information; establishing a new financial institution account with a financial institution selected from the list of possible financial institution candidates; and linking the new financial institution account to one or more additional accounts.

In yet another embodiment, a method for converting a first financial institution account for a customer is provided. The first financial institution account is associated with a payment association. The method comprises: receiving a request to convert the first financial institution account; determining a list of possible financial institutions that are associated with the payment association; and establishing a second financial institution account with a financial institution selected from the list of possible financial institutions, wherein the first and second financial institution accounts are associated with the payment association.

In another embodiment, a system for facilitating switching of financial institution accounts for a debit account holder is provided. The system comprises: a customer device configured to communicate infoiniation; and an account servicer comprising: logic configured to receive, from the user device, a request to convert the first financial institution account; logic configured to determine a list of possible financial institutions that are associated with the payment association; and logic configured to establish a second financial institution account with a financial institution selected from the list of possible financial institutions, wherein the first and second financial institution accounts are associated with the payment association that is associated with the first financial institution account.

A further understanding of the nature and the advantages of the inventions disclosed herein may be realized by reference of the remaining portions of the specification and the attached drawings.

DETAILED DESCRIPTION OF THE INVENTION

Figure 1:
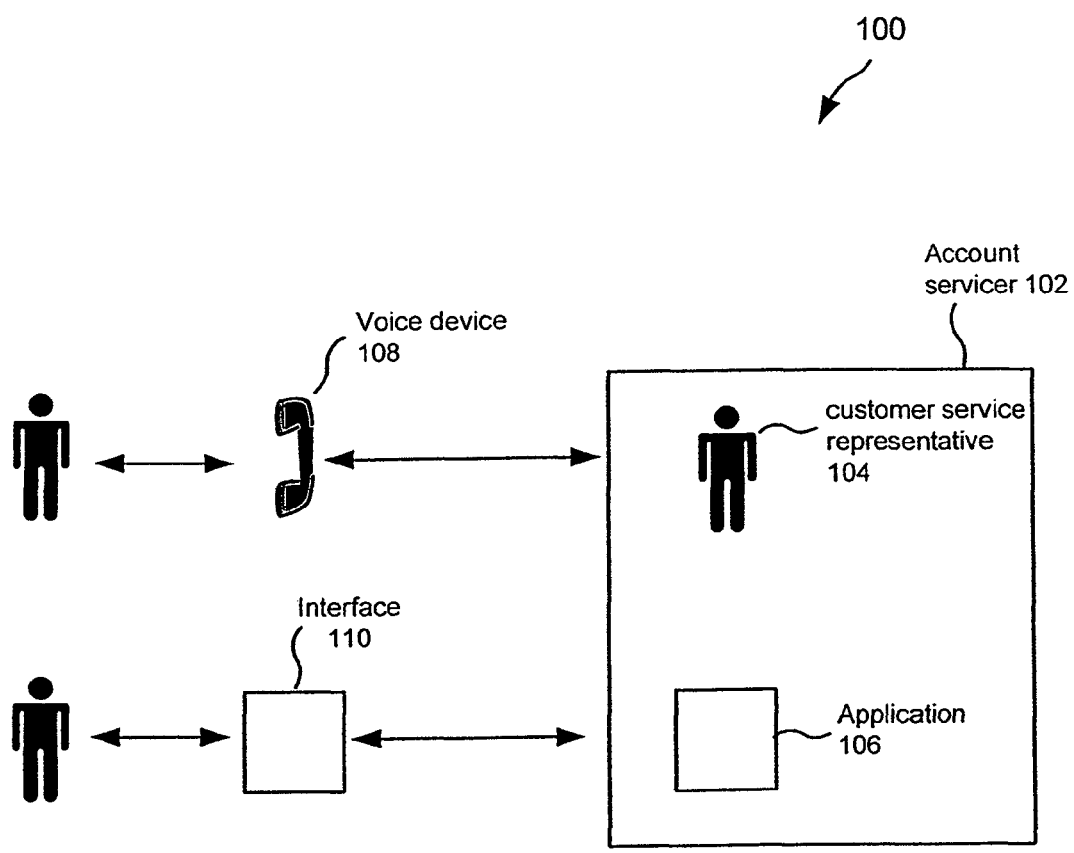
FIG. 1 depicts a system for converting a financial institution account for a customer according to one embodiment of the present invention.

FIG. 1 depicts a system 100 for converting a financial institution account for a customer according to one embodiment of the present invention. System 100 includes an account servicer 102 that interacts with a customer through a voice device 108 and/or interface 110. Although voice device 108 and interface 110 are shown, a person skilled in the art will recognize other methods of contacting account servicer 102, such as through regular mail.

Account servicer 102 includes a customer service representative 104 and application 106. Account servicer 102 is configured to process the conversion of a current financial institution account for a customer to a new financial institution account. In one embodiment, the financial institution accounts may be direct deposit accounts (DDAs). However, it will be recognized that other financial institution accounts may be converted, such as money market accounts, stock trading accounts, savings accounts, etc. A financial institution may include a bank, a brokerage with a cash management account, or any other financial institution that may have an account for a customer in which a branded card is attached.

A customer that is associated with the financial institution accounts typically uses a card, such as a debit card, for various transactions. For example, a debit account holder may use a debit card to purchase goods.

Customer service representative 104 includes a representative who can interact with a customer that contacts account servicer 102. Application 106 includes any application that can interact with the customer and also process a financial institution account conversion request. It will be understood that the functions described may be performed by customer service representative 104, application 106, or a combination of customer service representative 104 and application 106.

As shown, a customer may contact account servicer 102 through a voice device 108. For example, voice device 108 may be a telephone, cellular phone, or any other telephonic device. Through voice device 108, a customer may initiate the process by talking to a customer service representative 104.

A customer may also use voice device 108 to interact with application 106. In this case, application 106 may be an interactive voice response system that guides a customer through the process of converting financial institution accounts.

A customer may also contact account servicer 102 through a computer network, such as the Internet. In this embodiment, a customer may use interface 110. Examples of interface 110 include an Internet browser, cellular phone with a browser, instant message client, etc. Through interface 110, a customer can interact with application 106 to automatically process the financial institution account conversion. For example, a web page that guides a customer through the financial institution account conversion may be used. Application 106, in response to information obtained from the customer, may automatically process the financial institution account conversion as described below. Also, additional web pages may be presented by application 106 to complete the financial institution account conversion.

In another embodiment, a customer may use interface 110 to contact customer service representative 104. For example, instant messaging, email, etc. may be used to interact with customer service representative 104. In this case, customer service representative 104 may obtain information through interface 110 in order to convert the financial institution account.

Figure 2:
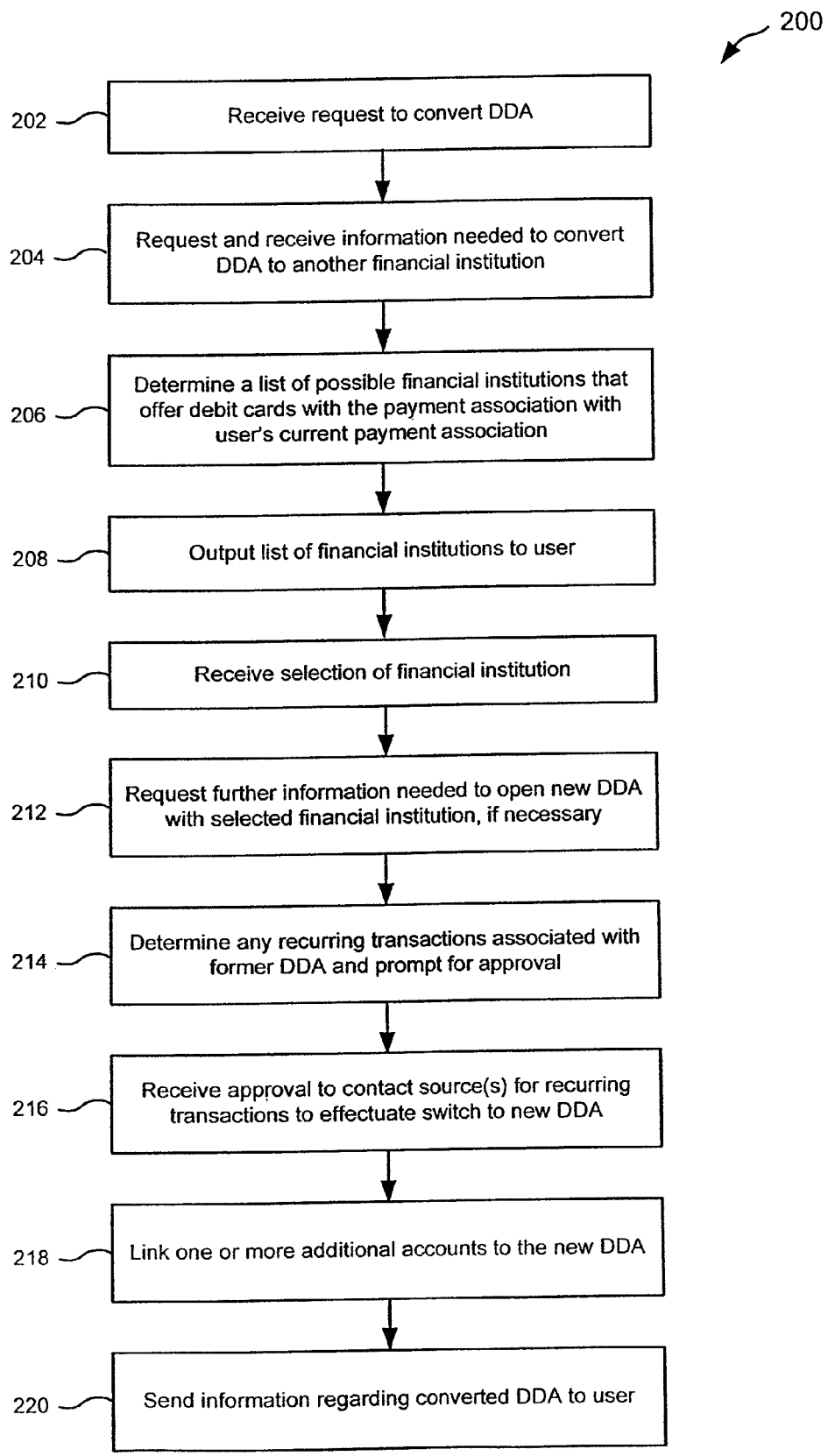
FIG. 2 depicts a simplified flowchart of a method for converting a financial institution account for a customer according to a one embodiment of the present invention.

FIG. 2 depicts a simplified flowchart 200 of a method for converting a financial institution account for a customer according to one embodiment of the present invention. The following process may be performed by account servicer 102. In one embodiment, customer service representative 104, application 106, or any combination thereof may be used to perform the steps described. In one embodiment, application 106 is used to perform the process automatically.

In step 202, a request to convert a direct deposit account (DDA) is received. In one embodiment, the customer request is for converting a DDA that is associated with the customer's debit card. Although a DDA associated with a customer's debit card is described, it will be recognized that other financial institution accounts may be used. Also, cards other than debit cards may be associated with the financial institution accounts, such as prepaid or stored value cards, etc.

In step 204, account servicer 102 requests and receives information needed to convert the DDA to another financial institution. For example, the relevant information includes name, contact information, home and work location, etc., for the customer. In one embodiment, account servicer 102 may also retrieve this information from a database if it has been previously stored for the customer.

In one example, application 106 receives the request in step 202 and is configured to automatically confirm the request to convert DDAs and request additional information that is needed. Application 106 may also retrieve the information from the database if it is stored. In another example, customer service representative 104 may interactively confirm an interest in converting DDAs and obtain the relevant information.

In step 206, a list of possible financial institutions that offer debit cards with the payment association that a customer is currently using is determined. In one embodiment, a possible financial institution candidate may be identified in various ways. For example, a customer may prioritize or rank information, such as preferences about financial institution branches and/or ATM locations. The prioritized information is then treated as criteria to rank financial institutions in a database. The highest ranked financial institutions are then determined by account servicer 102. Alternatively, the list of possible financial institution candidates may include only the "best fit" financial institution as most suited for the customer based on the relevant information provided. Also, a list of possible financial institution candidates may include a number of different financial institutions in order to provide a customer with a choice.

In step 208, a list of the possible financial institutions determined in step 206 is presented to a customer. For example, customer service representative 104 may verbally provide the list or application 106 may send the list for display on interface 110.

In step 210, a selection for a financial institution from the list of financial institution candidates is received from the customer. In an alternative embodiment, steps 208 and 210 may be replaced by the automatic selection of a financial institution by account servicer 102. For example, account servicer 102 may determine the best fit and automatically select the financial institution for the customer. Account servicer 102 may also request confirmation of the automatic selection in some cases. This automatic selection may be performed by either customer service representative 104 and/or application 106. In another embodiment, customer service representative 104 may review the list of possible financial institution candidates with the customer. The customer then can select the preferred financial institution. In yet another embodiment, application 106 may display the list of financial institution candidates and a customer may select one of the financial institutions using interface 110.

In step 212, further information may be requested that is needed to open the new financial institution account with the selected financial institution. The information may include the customer's full legal name, contact information, employer information, marriage status, and method through which the account is initially funded. The additional information is then received from the customer and is forwarded to the selected financial institution to allow the new DDA to be opened. In one embodiment, any additional information may be submitted by customer service representative 104 to the new financial institution. Customer service representative 104 may then open the new DDA with the new financial institution. In another embodiment, application 106 may automatically send the information to the new financial institution in a new financial institution account request. The request may then cause the new financial institution to open up a new DDA for the customer.

In step 214, account servicer 102 determines if any recurring transactions, such as direct deposits, are associated with the former DDA. For example, recurring direct deposits, such as payroll, etc., may be identified. Recurring direct deposits are reviewed so that future deposits may be directed towards the new account. Account servicer 102 may review further accounts (such as recurring bills, automatic withdrawals, or transfers, etc.) linked to the former DDA. For example, any direct withdrawals from the old financial institution account may also need to be identified and switched to the new DDA. The withdrawals may be automatic withdrawals into another account or bill payment transactions.

If there are recurring transactions, account servicer 102 secures a requisite approval, if necessary, from a customer. This approval may be received through interface 110, and may include additional written authorization. In step 216, account servicer 102 receives approval to contact the source(s) for any recurring transactions determined in step 214 to effectuate the switch to the new financial institution account. If approval is received, customer service representative 104 and/or application 106 may contact the source(s) to effectuate the request.

In step 218, the new financial institution account is linked to one or more additional accounts. In one embodiment, the one or more additional accounts may include an account with the customer's existing payment association, any accounts associated with recurring transactions, etc.

If there is any reward or point balance associated with the customer's payment association, it may be linked to the new financial institution account. For example, a customer may have a certain number of points with a Visa loyalty and/or rewards program. These points are linked to the former DDA for the customer. The transition of the rewards or points may be transferred or linked to a new account maintained by the customer's existing payment association. This new account is then linked to the new DDA. Also, the rewards or points in the current account may be linked with the new DDA. Thus, the customer may not lose the reward or point balance. Additionally, when the debit card for the new financial institution account is used, a customer may continue to accrue rewards or points for that new financial institution account with the existing payment association. Thus, a customer may retain as well as add to the rewards or points already accrued. For example, a customer's account with a payment association may have 10,000 points accrued. A customer can then add to that point total by using a debit card associated with the new DDA.

Any recurring transactions may also be linked to the new financial institution account. Thus, any recurring transactions linked to the old financial institution account are linked to the new financial institution account. In one embodiment, the recurring transaction is linked to the new financial institution account by linking the recurring transaction to an account for the source of the recurring transaction. For example, a direct deposit from an employer may be linked to the new financial institution account.

In step 220, information is sent regarding the converted financial institution account to the customer. Information may be sent for the customer's review and also a confirmation from a customer may be required. The information may be forwarded to the customer in a number of ways, including, for example, email or regular mail.

Figure 3:
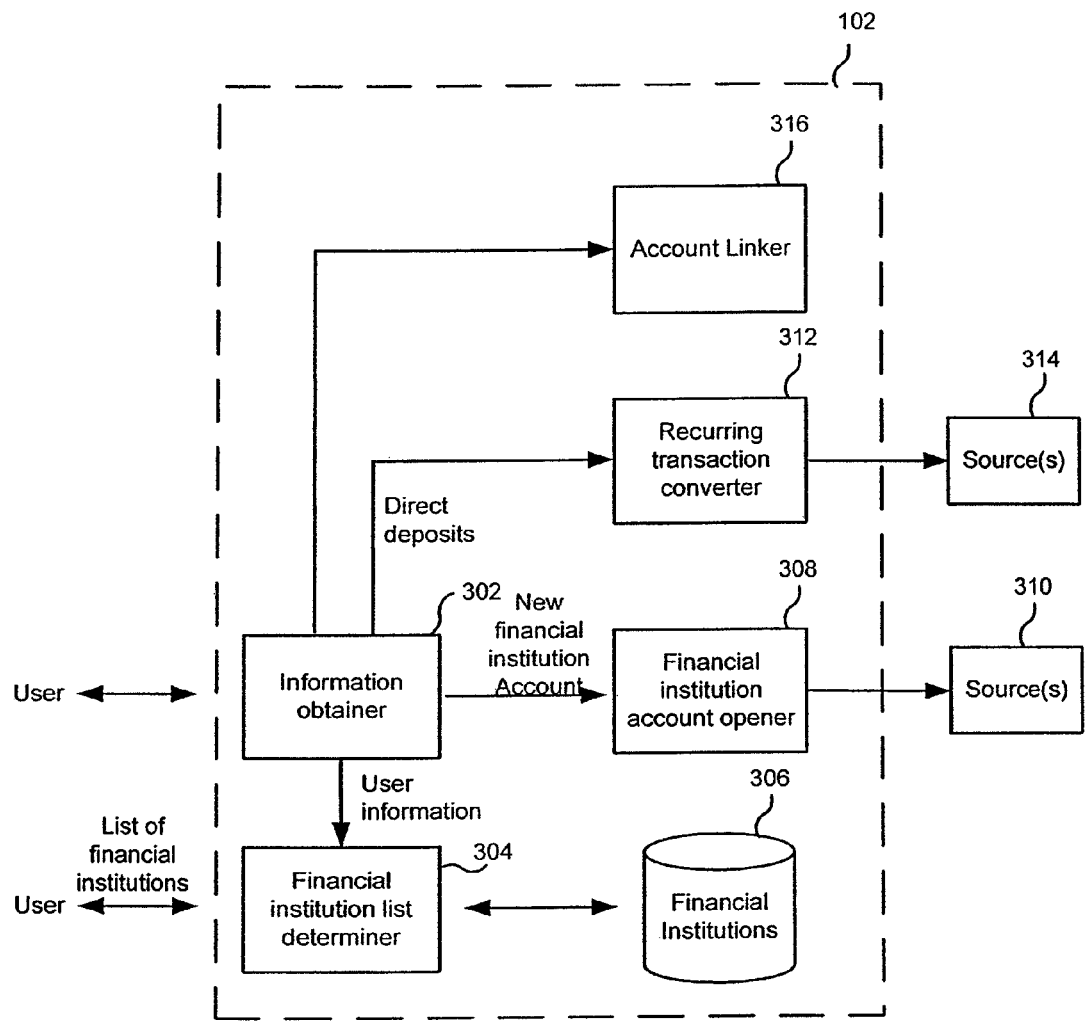
FIG. 3 depicts modules used in account servicer according to one embodiment of the present invention.

FIG. 3 depicts modules used in account servicer 102 according to one embodiment of the present invention. In one embodiment, the modules may be implemented in software, hardware, or any combination thereof. As shown, account servicer 102 includes an information obtainer 302, a financial institution list determiner 304, a database 306, a financial institution account opener 308, a direct deposit switcher 312, and an account linker 316.

Information obtainer 302 is configured to receive information from a customer. For example, information obtainer 304 may interact directly with a customer. After receiving a request to convert DDAs, information obtainer 302 requests and receives information needed to convert a DDA to another financial institution.

Financial institution list determiner 304 receives the customer information from information obtainer 302 and is configured to determine a list of possible financial institutions that offer debit cards with a payment association associated with the customer's existing DDA. Financial institution list determiner 304 may determine the list of financial institutions using a financial institution list stored in database 306. The list is then outputted to a customer in one embodiment. Accordingly, financial institution list determiner performs the functions described with respect to step 206 and 208 of FIG. 2.

Information obtainer 302 is configured to receive a selection of a financial institution from the customer and request further information from the customer as described in steps 210 and 212 of FIG. 2. The information is then sent to financial institution account opener 308. Financial institution account opener 308 is configured to contact source(s) 310 to open a new DDA for the customer.

Information on direct deposits or any other recurring transactions are then determined by information obtainer 302. Recurring transaction converter 312 then uses the information to contact source(s) 314 to effectuate a change for the recurring transactions.

Account linker 316 is then used to link the new account with one or more additional accounts. For example, any recurring transactions or rewards or point totals may be linked to the new account. Account linker 316 may link an account associated with the payment association to the new DDA. Thus, a customer can now accrue points or rewards for the new DDA. Also, account linker 316 may link any accounts for recurring transactions to the new account.

Accordingly, the process described above may be carried out interactively using customer service representative 104 and/or application 106. The process facilitates the transferring of a customer's DDA to another financial institution while keeping the same payment association. This eliminates multiple steps that the customer may have to manually perform. A customer may also not have easy access to information that is provided by customer service representative 104 and/or application 106. As a result, without the present invention, a customer may decide to not transfer his/her DDA to another financial institution that supports the payment association. Thus, providing this process may increase a retention rate for customers for the payment association.

The process may also be performed automatically by application 106. Thus, a customer may easily communicate with application 106 through an interface 110, such as through the Internet. The process is automated in that information is solicited from the customer and all the necessary information is obtained. Application 106 is then configured to automatically contact the appropriate entities in order to process the conversion of the financial institution account to another financial institution. Thus, application 106 facilitates the automatic conversion of one DDA to another DDA while keeping the same payment association for the customer.

The process described above is merely one exemplary embodiment. It should be understood that other alternative exemplary embodiments are possible. For example, one or more of the functions described above in connection with account servicer 102 can be performed in an automated manner. Also, although a DDA associated with a customer's debit card is described, it will be recognized that other financial institution accounts may be used. For example, the process may be applied to credit card accounts, money market accounts, stock trading accounts, savings accounts, etc. A financial institution may include a bank, a brokerage with a cash management account, or any other financial institution that may have an account for a customer in which a branded card is attached. Also, cards other than debit cards may be associated with the financial institution accounts, such as prepaid or stored value cards, credit cards, or any other branded card.

The present invention can be implemented in the form of control logic in software or hardware or a combination of both. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for converting a first financial institution account for a customer, the first financial account with a first financial institution account with a first financial institution and being associated with a payment association, the method comprising:
   receiving a request to convert the first financial institution account associated with the customer;
   receiving information including account information for the first financial institution account, the account information indicating the payment association associated with the first financial institution account;
   determining, by logic implemented in hardware, a list of financial institution candidates based on the received information;
   establishing a new financial institution account with a financial institution selected from the list of financial institution candidates; and
   linking the new financial institution account to one or more additional accounts, wherein the new financial institution account is associated with the same payment association as the first financial institution account.

2. The method of claim 1, further comprising:
   effectuating a switch of one or more recurring transactions relating to the first financial institution account to the new financial institution account, wherein the recurring transaction is a direct deposit associated with the first financial institution account for the customer.

3. The method of claim 1, wherein the first financial institution account is associated with a recurring transaction, and wherein the method further comprises:
   prior to the linking, determining that the recurring transaction is associated with the first financial institution account for the customer.

4. The method of claim 1, wherein the first financial institution account is associated with a recurring transaction, and wherein the method further comprises:
   receiving approval, from the customer, to contact a source of the recurring transaction to effectuate a switch from the first financial institution account to the new financial institution account.

5. The method of claim 4, further comprising:
   based on the receiving of the approval, contacting the source to effectuate the switch for the recurring transaction to the new financial institution account.

6. The method of claim 5, wherein the determining comprises determining a best fit financial institution and automatically selecting the best fit financial institution for the customer.

7. The method of claim 1, further comprising:
effectuating a switch of one or more recurring transactions relating to the first financial institution account to the new financial institution account, wherein the recurring transaction is a withdrawal associated with the first financial institution account for the customer.

8. The method of claim 7, wherein the withdrawal is a recurring transfer of funds from the first financial institution account for the customer to a receiving financial institution account for the customer.

9. The method of claim 7, wherein the withdrawal is a recurring transfer of funds from the first financial institution account for the customer to satisfy a recurring bill from a debtor.

10. The method of claim 1, wherein the list of financial institution candidates includes financial institution candidates that support the payment association.

11. The method of claim 1, further comprising:
contacting one or more respective sources for one or more recurring transactions associated with the first financial institution account; and
effectuating a switch for the one or more recurring transactions to the new financial institution account.

12. The method of claim 1, wherein the one or more additional accounts includes an account associated with the same payment association.

13. The method of claim 1, wherein linking the new financial institution account to the one or more additional accounts including the first financial institution account includes linking the new financial institution account to rewards or point totals associated with the payment association of the first financial institution account.

14. A system for facilitating switching of financial institution accounts for a customer, the system comprising:
one or more processors;
one or more non-transitory computer-readable storage media containing instructions configured to cause the one or more processors to perform operations including:
receiving a request to convert the first financial institution account associated with the customer;
receiving information including account information for the first financial institution account, the account information indicating the payment association associated with the first financial institution account;
determining a list of financial institution candidates based on the received information;
establishing a new financial institution account with a financial institution selected from the list of financial institution candidates; and
linking the new financial institution account to one or more additional accounts, wherein the new financial institution account is associated with the same payment association as the first financial institution account.

15. The system of claim 14, further comprising instructions configured to cause the one or more processors to perform operations including:
effectuating a switch of one or more recurring transactions relating to the first financial institution account to the new financial institution account, wherein the recurring transaction is a direct deposit associated with the first financial institution account for the customer.

16. The system of claim 14, wherein the first financial institution account is associated with a recurring transaction, and wherein the method further comprises:
prior to the linking, determining that the recurring transaction is associated with the first financial institution account for the customer.

17. The system of claim 14, wherein the first financial institution account is associated with a recurring transaction, and wherein the method further comprises: receiving approval, from the customer, to contact a source of the recurring transaction to effectuate a switch from the first financial institution account to the new financial institution account.

18. The system of claim 17, further comprising instructions configured to cause the one or more processors to perform operations including:
based on the receiving of the approval, contacting the source to effectuate the switch for the recurring transaction to the new financial institution account.

19. The system of claim 18, wherein the determining comprises determining a best fit financial institution and automatically selecting the best fit financial institution for the customer.

20. The system of claim 14, further comprising instructions configured to cause the one or more processors to perform operations including:
effectuating a switch of one or more recurring transactions relating to the first financial institution account to the new financial institution account, wherein the recurring transaction is a withdrawal associated with the first financial institution account for the customer.

21. The system of claim 20, wherein the withdrawal is a recurring transfer of funds from the first financial institution account for the customer to a receiving financial institution account for the customer.

22. The system of claim 20, wherein the withdrawal is a recurring transfer of funds from the first financial institution account for the customer to satisfy a recurring bill from a debtor.

23. The system of claim 14, wherein the list of financial institution candidates includes financial institution candidates that support the payment association.

24. The system of claim 14, further comprising instructions configured to cause the one or more processors to perform operations including:
contacting one or more respective sources for one or more recurring transactions associated with the first financial institution account; and
effectuating a switch for the one or more recurring transactions to the new financial institution account.

25. The system of claim 14, wherein the one or more additional accounts includes an account associated with the same payment association.

26. The system of claim 14, wherein linking the new financial institution account to the one or more additional accounts including the first financial institution account includes linking the new financial institution account to rewards or point totals associated with the payment association of the first financial institution account.

* * * * *